United States Patent [19]

König

[11] Patent Number: 6,159,909

[45] Date of Patent: Dec. 12, 2000

[54] CUTTING INSERT FOR MACHINING

[75] Inventor: Udo König, Essen, Germany

[73] Assignee: Widia GmbH, Essen, Germany

[21] Appl. No.: 09/380,071

[22] PCT Filed: Feb. 21, 1998

[86] PCT No.: PCT/DE98/00553

§ 371 Date: Aug. 24, 1999

§ 102(e) Date: Aug. 24, 1999

[87] PCT Pub. No.: WO98/39499

PCT Pub. Date: Sep. 11, 1998

[30] Foreign Application Priority Data

Mar. 5, 1997 [DE] Germany ............................ 197 08 880

[51] Int. Cl.$^7$ ............................ C10M 43/28; C23C 30/00
[52] U.S. Cl. ........................ 508/108; 407/118; 407/119;
428/206; 428/208; 428/213; 428/698
[58] Field of Search .............................. 508/108; 407/119,
407/118; 428/206, 208, 213, 698

[56] References Cited

U.S. PATENT DOCUMENTS

| | | |
|---|---|---|
| 4,415,419 | 11/1983 | Niederhaeuser et al. . |
| 4,619,866 | 10/1986 | Smith et al. . |
| 5,376,454 | 12/1994 | Sugasawa et al. . |
| 5,415,791 | 5/1995 | Chou et al. . |
| 5,482,637 | 1/1996 | Rao et al. . |
| 5,948,541 | 9/1999 | Inspektor ................ 428/469 |
| 5,984,593 | 11/1999 | Bryant ..................... 407/119 |

FOREIGN PATENT DOCUMENTS

| | | |
|---|---|---|
| 0 534 905 A2 | 3/1993 | European Pat. Off. . |
| 0 695 884 A1 | 2/1996 | European Pat. Off. . |
| 36 23 929 1 | 1/1988 | Germany . |
| 41 37 591 A1 | 6/1992 | Germany . |
| 43 14 432 A1 | 11/1994 | Germany . |
| 43 15 451 A1 | 11/1994 | Germany . |
| 195 15 234 A1 | 10/1996 | Germany . |
| 07258597 | 10/1995 | Japan . |
| WO 96/30148 | 10/1996 | WIPO . |

OTHER PUBLICATIONS

Schmierstoffe Und Verwandte Produkte by D. Klamann, published by Verlag Chemie 1982, pp. 75–76.

*Primary Examiner*—Jacqueline V. Howard
*Attorney, Agent, or Firm*—Herbert Dubno

[57] ABSTRACT

The invention concerns a cutting insert for machining, said cutting insert comprising a single or outer layer consisting of a plastics material with solid lubricant particles dispersed therein, preferably sulphides and/or selenides of molybdenum, tungsten and/or titanium. The solid lubricant particles are preferably dispersed in the paint which is applied to the cutting insert by treatment in an immersion bath, spraying, painting or passing through a paint mist and electrostatically.

15 Claims, No Drawings

CUTTING INSERT FOR MACHINING

SPECIFICATION CROSS REFERENCE TO RELATED APPLICATIONS

This is a national stage of PCT/DE98/00553 filed Feb. 21, 1998 and based upon German national application 197 08 880, filed Mar. 5, 1997 under the International Convention.

BACKGROUND OF THE INVENTION

From the state of the art it is known that the wear characteristics of cutting inserts which are comprised for example of a hard metal, a cermet, a ceramic or steel, can be improved by a coating. Especially with hard metal cutting inserts for turning, milling, boring, thread cutting and reaming, there are known coatings of carbides, nitrides, carbonitrides, oxycarbonitrides, oxides and/or borides of at least one of the elements of Groups IVa to VIa of the Periodic System as are ceramic coatings. As examples mention may be made of titanium carbide, titanium nitride, and/or aluminum oxide. The thicknesses of such layers as a rule amounts to 5 to 15 $\mu$m. Uncoated as well as coated cutting inserts are usually cooled by means of liquid cooling lubricants during the machining to reduce or carry away the heat resulting from chip formation. The use of liquid cooling lubricants can however counteract an effective corrosion protection as long as one cannot be certain that no reactions between the compounds contained in the cooling lubricant with the workpiece surface can result. Apart from this, however, liquid cooling lubricants are in part detrimental to health and must be disposed of in an expensive manner.

There have already been proposals to avoid liquid cooling lubricants and instead of them to provide conditions under which the tools can operate dry. For example, in U.S. Pat. No. 4,619,866, a process for producing a substrate body of a hard metal or a ceramic with an $Al_2O_3$ coating is described in which the substrate body is subjected to a gas phase containing one or more metal halogenides at 7000 to 1200° C. in a CVD process. To increase the layer growth of the $Al_2O_3$, a substance selected from the group which consists of sulphur, selenium, tellurium, phosphorous, arsenic, antimony, bismuth or mixtures thereof is added to the gas phase in an amount of 0.03 to 1 volume %. For example, $H_2S$ can be added for both an increase in the deposition speed and also to give rise to the formation of a aluminum oxide and κ aluminum oxide. From a point of view of process technology, however the use of $H_2S$ is detrimental both because of its extremely unpleasant odor and also because it contaminates the apparatus with $H_2S$ decomposition products.

A process which corresponds thereto is described also in EP 0 523 021 A1 in which a substrate body is coated with at least one of the carbides, nitrides, carbonitrides or oxycarbonitrides of elements in Groups IVa to VIa of the Periodic System and to which in the reaction gas 0.4% $H_2S$, Inter alia, can be added.

To generate a crack-free surface coating, EP 0 659 903 A1 proposes to add to the gas atmosphere which aside from hydrogen contains $CO_2$, CO and $AlCl_3$, an amount of 0.2% $SF_6$, in addition to 4% HCl, the balance hydrogen.

EP 0 534 905 B1 describes a process for producing a machining tool which is coated with at least one compound comprised of at least one element of the group O, S, Se, Te on the one hand, and at least one Group V element, Nb, Ta, Cr, Mo and W on the other hand. Molybdenum disulfide especially can serve as a wear-reducing lubricant layer. The disadvantage of a pure molybdenum disulfide layer is that the limited hardness of the layer causes it to be rapidly worn off.

From DE 202 898 there is known, for example, a sequence of a hard material layer of TiC and a soft $MoS_2$ layer, by means of which the advantage of the increased hardness of TiC can be linked with an improved frictional coefficient of the outer layer.

Similar advantages can apply for slide bearings made from stainless steels. According to DE 24 15 255 A1, for example, an increase of adhesion of the bearing surface by sputtered $MoS_2$ or $WS_2$ can be obtained by providing a base layer of a thickness of 1 to 2 $\mu$m and then a further polished layer which can be comprised of MoS2, $WS_2$ or a synthetic resin like polytetrafluoroethylene. A disadvantage of such layers is that they require an extensive PVD technology.

OBJECT OF THE INVENTION

It is the object of the present invention to provide a cutting insert and a method of making same such that this cutting insert can be used dry, i.e. without a cooling lubricant, can be fabricated at the lowest possible cost and has a high useful life.

DESCRIPTION OF THE INVENTION

This object is achieved with the cutting insert according to the invention having a single or outermost layer of a synthetic resin with solid lubricant particles dispersed therein, preferably sulfides or selenides of molybdenum, tungsten and/or titanium. The advantage of these cutting inserts is that such a layer need not be applied by vapor deposition but can be applied by painting, lacquering, spraying or the like. It is true that the carrier, depending upon its wear properties, can be relatively rapidly removed by the chips which are machined away but new solid lubricant particles can be engaged in the process to reduce friction continuously from the edge of the contact zone.

By contrast with hard material layers or other multilayer hard material coatings, which tend to ablate or spall with increasing thickness, the thickness of the single outer layer doped with solid lubricant particles is not critical. The layer can be thicker than hard material layers in order to supply a sufficient quantity of solid lubricant particles. The layer thickness can thus lie between 5 $\mu$m and 500 $\mu$m with best results with layer thicknesses between 50 $\mu$m and 150 $\mu$m.

The synthetic resin in which the solid lubricant particles are bonded is preferably a thermosetting or thermoplastic polymeric material which can for example be polytetrafluoroethylene (PTFE) which itself is soft, flexible, ductile and wear-resistant.

The volume proportion of the solid lubricant particles in the layer can be selected in accordance with the machining conditions and amounts to between 10% and 80%. Below 10% the lubricant characteristics are too weak and above 80% the single or outer layer is too soft. The particle size of the solid lubricant particles lies preferably between 0.1 $\mu$m and 20 $\mu$m.

The synthetic resin can also be a lacquer which has the advantage that it can be sprayed or painted on. For example it can be a thermosetting synthetic resin on the basis of epoxy, polyester, polyurethane or acrylate resins. Further preferred synthetic resins are alkyd resin lacquers, polyester lacquers, cellulose nitrate lacquers (nitrolacquers), a lacquer formed by vinyl polymerization or a phenol resin lacquer.

According to a further feature of the invention, coloring pigments can be incorporated in the single or outer layer which can be used to identify the cutting inserts, for example from the point of view of useful ranges, lubricant doping, etc.

The synthetic resin can include, apart from the solid lubricant, especially molybdenum disulfide particles, other nonorganic fillers.

Preferably the synthetic resin with the solid lubricant particles dispersed therein can be applied by brush application, spraying or immersion in a bath, or in an aerosol.

An embodiment of the invention, compared with the state of the art is described in the following.

For the comparative test, individual cutting tools with the turning cutting insert designation CNMG 120412 were used. The machined material was an alloy of the type X5CrNi18 9. A first series of turning inserts had successions of layers to a total thickness of 12 $\mu$m of TiN, TiCN and TiN as applied by CVD. A portion of these plates were cleaned in an ultrasonic bath and immersed in a bath which was composed of a viscous mass of a colorless nitro-combination lacquer with finely divided molybdenum disulfide powder. After the immersion step, the plates were shaken off and dried in a furnace at 120° C. After the drawing, the plates were found to have a blackish-gray coating of a thickness of 120$\mu$m which was comprised of a lacquer loaded with molybdenum disulfide. This lacquer was wear-resistant.

The comparative machining tests were carried out by turning a shaft of the ductile high alloy steel X5CrNi18 9 (stainless steel). It is known that the thermal stress on the cut inserts is especially high with this material. The following cutting parameters were established:

| | |
|---|---|
| Cutting speed | 140 m/min |
| Cutting depth | 2.5 mm |
| Feed | 0.25 mm/revolution |

Machining without a cooling lubricant.

The cutting process was interrupted after brief intervals of 10 to 30 seconds for microscopic examination of the cutters. On the cutting plates without MoS$_2$ doped lacquer, no measurable wear was detected. With the cutting plates having MoS$_2$ coating, the machining contact with the cutting corner (the removed chips) has removed the lacquer layer to the hard material coating to liberate the latter and the MoS$_2$ lacquer was found to be shifted in the direction of the chip run-off but no wear was noted on the uppermost TiN layer. The turning tests were then continued and the cutting checked after longer time intervals by establishing wear-marking widths VB of the main and auxiliary cutting edges with a measuring microscope. The following table shows the progressive wear of the main cutting edge VB and the maximum detectable wear Vb$_{max}$.

| | Turning Cutting Plate | | | |
|---|---|---|---|---|
| Cutting | With MoS$_2$ Lacquer | | Without MoS$_2$ Lacquer | |
| time tc | VB mm | Vb$_{max}$ mm | VB mm | Vb$_{max}$ mm |
| 10 s | — | — | — | — |
| 30 s | — | — | — | — |
| 2 min | 0.04 | 0.09 | 0.05 | 0.08 |
| 4 min | 0.06 | 0.12 | 0.05 | 0.12 |
| 16 min | 0.07 | 0.16 | 0.23 | 0.97*) |
| 32 min | 0.10 | 0.24 | | |

*)Main Cutting Edge Broken

As can be seen from the table, the cutting inserts with the additional coating of MoS$_2$ lacquer resisted wear. The useful time can be more than doubled. An explanation for the significant improvement in the useful time is that the MoS$_2$ layer, while rapidly removed from the contact zone of the chip, nevertheless continuously introduces new MoS$_2$ particles which are friction-reducing from the edge of the contact zone into the process.

In a further test, the cutting inserts without the coating of the invention were used to machine the same object but with the use of lacquer-cooling lubricant. The achieved cutting times were between 20 and 24 minutes. This showed that the synthetic resin layer doped with the dry lubricant itself is advantageous from the point of view of use time when conventional (wet) cooling lubricant is used. As the synthetic resin which functions as a carrier for the solid lubricant particles, different air-hardenable lacquers can be used, especially two-component lacquers and thermosetting resins like epoxy resins. Thermoplastic resins can also be employed except that higher temperatures are then required for the coating.

The color coating of the lacquers enables desirable differentiation as to the properties of the cutting inserts.

The application of the MoS$_2$ containing coating can be effected by brushing the coating on, rolling the coating on with a spongy roller, spraying the coating on (using gas pressure) or by means of some other painting process, for example by aerosol painting using the electrostatic effect, in addition to the immersion process described. Apart from molybdenum disulfide, especially molybdenum diselenide and the sulfides and selenides of tungsten and titanium are suitable as solid lubricants. The preferred layer thickness of the doped synthetic resin is between 50 $\mu$m and 150 $\mu$m.

What is claimed is:

1. A metal-machining tool comprising:
    a cutting insert having a cutting edge; and
    a wear-reducing coating on said cutting insert at said cutting edge, said wear-reducing coating being composed of at least one layer and having a composition of an outermost layer which consists of a synthetic resin adherent to said cutting insert and a proportion of solid lubricant particles dispersed in said synthetic resin sufficient to reduce wear of said cutting insert and selected from the group which consists of sulfides and selenides of molybdenum, tungsten and titanium.

2. The metal-machining tool defined in claim 1 wherein said layer of said composition has a thickness between 5 $\mu$m and 500 $\mu$m.

3. The metal-machining tool defined in claim 2 wherein said thickness is between 50 $\mu$m and 150 $\mu$m.

4. The metal-machining tool defined in claim 2 wherein said synthetic resin is selected from the group which consists of thermosetting synthetic resins and thermoplastic synthetic resins.

5. The metal-machining tool defined in claim 4 wherein the volume proportion of said solid lubricant particles in said synthetic resin is 10 volume percent to 80 volume percent and said solid lubricant particles have a particle size between 0.1 µm and 20 µm.

6. The metal-machining tool defined in claim 5 wherein said synthetic resin is a lacquer.

7. The metal-machining tool defined in claim 6 wherein said synthetic resin is a thermosetting powder lacquer.

8. The metal-machining tool defined in claim 7 wherein said synthetic resin is selected from the group which consists of epoxy, polyester, polyurethane and acrylic resins.

9. The metal-machining tool defined in claim 6 wherein said lacquer is selected from the group which consists of alkyd resin lacquers, polyester lacquers, cellulose nitrate lacquers, vinyl polymerization lacquers and phenol resin lacquers.

10. The metal-machining tool defined in claim 6, further comprising a coloring pigment incorporated into said synthetic resin.

11. A method of making a metal-machining tool comprising coating a cutting insert having a cutting edge, with a wear-reducing coating on said cutting insert at said cutting edge, said wear-reducing coating being composed of at least one layer and having a composition of an outermost layer which consists of a synthetic resin adherent to said cutting insert and a proportion of solid lubricant particles dispersed in said synthetic resin sufficient to reduce wear of said cutting insert and selected from the group which consists of sulfides and selenides of molybdenum, tungsten and titanium.

12. The method defined in claim 11 wherein said coating is applied to said cutting insert by an immersion in a bath.

13. The method defined in claim 11 wherein said coating is applied to said cutting insert by spraying the coating as a lacquer onto the insert.

14. The method defined in claim 11 wherein said coating is applied to said cutting insert by brushing the coating in the form of a lacquer onto the insert.

15. The method defined in claim 11 wherein said coating is applied to said cutting insert by passing the insert through an aerosol of lacquer in an electrostatic coating system.

* * * * *